Figure 1:
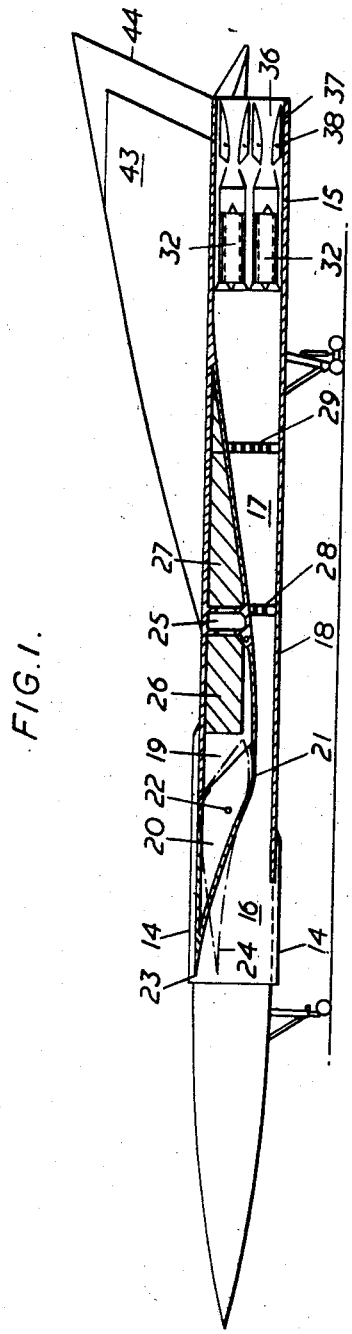

July 12, 1960   R. J. LANE ET AL   2,944,764
JET-PROPELLED AIRCRAFT

Filed Aug. 27, 1959   3 Sheets-Sheet 3

Inventors
Raymond John Lane
Raymond Frederick Sargent
By
Bailey, Stephens & Huettig
Attorneys United States Patent Office 2,944,764
Patented July 12, 1960

2,944,764
JET-PROPELLED AIRCRAFT

Raymond John Lane and Raymond Frederick Sargent, Bristol, England, assignors to Bristol Siddeley Engines Limited, Bristol, England, a British company Filed Aug. 27, 1959, Ser. No. 836,420

Claims priority, application Great Britain Sept. 1, 1958

7 Claims. (Cl. 244—15)

The invention concerns an aircraft propelled by air-heating engines and intended for flight at supersonic speeds, and is that the aircraft comprises two elongated accommodation bodies spaced apart in side-by-side relation and each comprising a sharply pointed forebody, a centrebody of constant width and depth, and an afterbody tapering in width, the two accommodation bodies being interconnected, only in the regions of their centrebodies and afterbodies, by a power plant body, of generally rectangular section in transverse planes, comprising an air intake opening at its forward end, a diffuser passage leading rearwardly from the intake, air heating means connected to receive air discharged from the diffuser, and a propulsion nozzle connected to receive the heated air and to discharge it from the rear end of the power plant body, the aircraft also comprising two wings, each with a swept back leading edge, extending laterally one from each of the accommodation bodies on the side of the body facing away from the power plant body.

Figure 2:
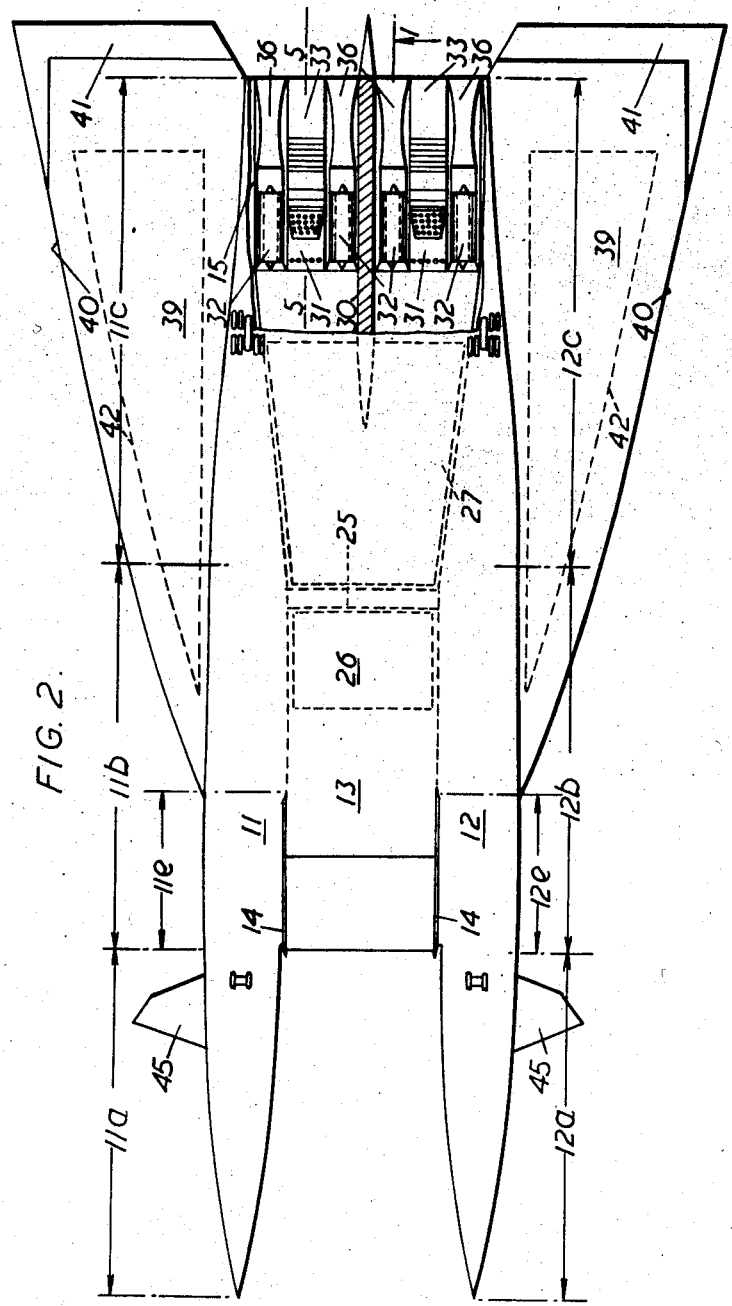
Figure 3:
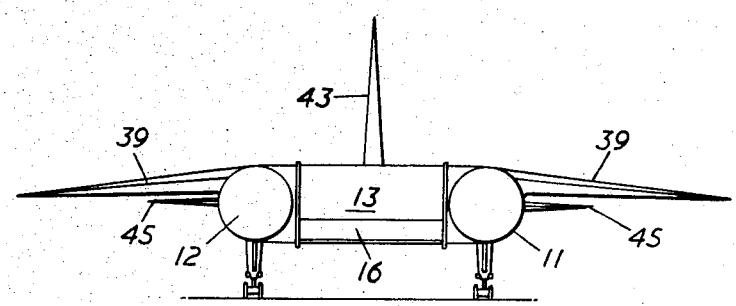
Figure 4:
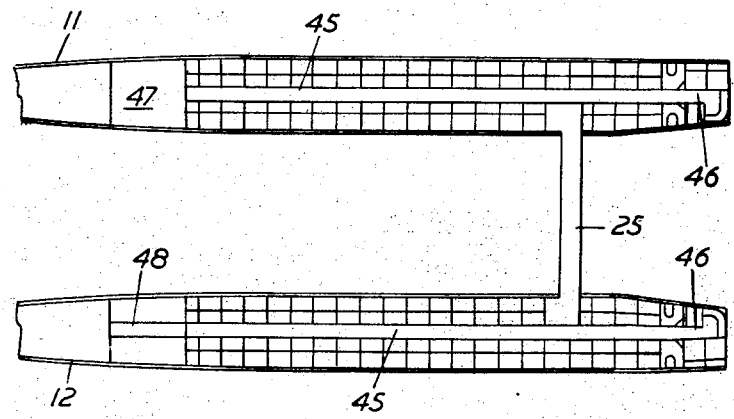
Figure 5:
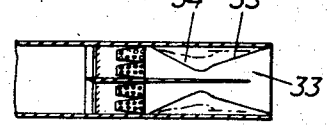

These and other features of the invention will be described in more detail by reference to a particular example shown schematically in the accompanying drawing. In the drawing:

Figure 1 is a sectional elevation taken on a vertical-longitudinal plane through the power plant body as indicated by the line 1—1 in Figure 2, which is an underneath plan view of the aircraft with part of the shell of the power plant body cut away to reveal propulsion engines, Figure 3 is a front end elevation, Figure 4 shows the arrangement of the accommodation spaces, and Figure 5 is a vertical section through one of the propulsion engines, taken on the line 5—5 in Figure 2.

The aircraft comprises two elongated accommodation bodies 11 and 12 arranged side-by-side and connected together in spaced relation by a power plant body 13. The two accommodation bodies are of identical size and shape and each comprises a sharply pointed forebody 11a and 12a respectively, a centrebody 11b and 12b of constant width and depth, and an afterbody 11c and 12c which tapers in width rearwardly but is of constant depth. The forebodies 11a and 12a are circular in section throughout but the centrebodies are transitional from circular to D shape in section over a first part of their length 11e and 12e respectively.

The power plant body 13 is rectangular in section, having the same depth as the centrebodies 11b and 12b and the afterbodies 11c and 12c, and is coextensive in length with these bodies. Over that part of its length corresponding to the transitional parts of the centrebodies the power plant body 13 is bounded at its sides by vertical walls which project slightly beyond its top and bottom surfaces to form airflow control fences 14. The width of the part of the power plant body lying between the centrebodies 11b and 12b is of course constant, while that of the part lying between the afterbodies 11c and 12c diverges for a first part of its length and terminates with a parallel portion 16 housing propulsion engines as presently more fully described. The forward end of the power plant body 13 is open to constitute an air intake 16, and a diffuser passage 17 leads rearwardly to the parallel portion 15. The intake and diffuser passage is bounded at its bottom by a thin flat wall 18 and at its top by a double-walled structure 19 the lower wall of which is shaped to give the intake and diffuser passage a desired convergent-divergent form suitable to obtain maximum pressure recovery at the cruising speed of the aircraft.

Since an intake of this form would be inefficient at lower speeds, causing excessive drag and throttling of the inflowing air, a forward part 20 of the structure 19, including the throat-forming portion 21, is mounted for pivoting around a transverse horizontal axis 22 arranged at a suitable location between the tip 23 of the upper boundary member of the intake and the throat 21. At lower speeds the part 20 is tilted downwardly into a position such as that indicated by the chain-dotted line 24.

Part of the remaining space within the structure 19 is used for a passage 25 allowing transit between the accommodation bodies, and the remainder is available for fuel tanks 26 and 27. The diffuser passage 17 may be provided at intervals with air-flow straightening grids 28, 29 acting also as structural members.

The propulsion engines mounted in the parallel portion 15 of the power plant body are preferably partly of turbojet type and partly simple combustors forming a ramjet system with the diffuser duct 17. In the example illustrated, the parallel portion 15 is divided into two bays by a vertical partition 30 and each bay houses a combustor 31 and four turbojet engines 32 grouped as two pairs of superimposed engines on each side of the combustor. The heated airstreams from all the engines are discharged from the rear end of the power plant body through adjustable convergent-divergent propulsion nozzles. The nozzles 33 for the combustors may be of a kind, illustrated in Figure 5, in which the outlet area remains constant while the throat area is varied. This is achieved by providing forward and rear boundary members 34 and 35 which are pivoted respectively at their forward and rear edges so that they can be moved from the position shown in full lines to that shown in chain-dotted lines. The nozzles 36 for the turbojet engines provide for variation of the outlet area and preferably also of the throat area. This may be done in the manner illustrated in Figure 1, using boundary members 37 extending from the throat to the outlet and pivoted at an intermediate point 38.

Extending laterally from the accommodation bodies 11 and 12 are two wings 39 having swept back leading edges 40. Preferably the wings are placed in a high-wing position so that their top surfaces are continuous with the top surfaces of the accommodation and power plant bodies. The wings may be provided with movable control surface portions 41 and contain fuel tanks 42. A vertical fin 43, also possibly with a movable control surface 44, is arranged projecting upwardly from the top surface of the power plant body and is structurally united with the partition 30 extending through the rear part of the body. Additional forward variable incidence control surfaces 45 may also be provided projecting outwards from the forebodies 11a and 12a.

Figure 4 shows an arrangement of the accommodation space in the bodies 11 and 12. In each body there is a large passenger compartment 45 and toilet compartments 46. Forward of the passenger compartment in the body 11 is a crew compartment 47, while a similar compartment 48 in the body 12 houses refrigeration plant required to reduce the temperature in the accommodation compartments to an acceptable level, the walls of these compartments being lined with heat insulation material.

We claim:

1. An aircraft for flight at supersonic speeds, comprising two elongated accommodation bodies spaced apart in side-by-side relation and each comprising a sharply pointed forebody, a centrebody of constant width and depth, and an afterbody tapering in width, the two accommodation bodies being interconnected, only in the regions of their centrebodies and afterbodies, by a power plant body, of generally rectangular section in transverse planes, comprising an air intake opening at its forward end, a diffuser passage leading rearwardly from the intake, air heating means connected to receive air discharged from the diffuser, and a propulsion nozzle connected to receive the heated air and to discharge it from the rear end of the power plant body, the aircraft also comprising two wings, each with a swept back leading edge, extending laterally one from each of the accommodation bodies on the side of the body facing away from the power plant body.

2. An aircraft according to claim 1 in which in each accommodation body the section of the forebody is circular, and the section of the centrebody is transitional from circular to D section over a first part of its length.

3. An aircraft according to claim 1 in which the intake and diffuser passage are bounded below by the lower wall of the power plant body, and above by a double-walled structure the lower wall of which gives a convergent-divergent form to the inlet and diffuser passage and the upper wall of which is the upper wall of the power plant body.

4. An aircraft according to claim 3 in which a forward part of the double-walled structure is mounted for pivoting around a transverse horizontal axis.

5. An aircraft according to claim 3 in which the double-walled structure contains a passage allowing transit between the accommodation bodies.

6. An aircraft according to claim 1 in which the air heating means includes at least one combustor forming with the diffuser a ramjet, and at least one turbojet engine receiving air from the same diffuser.

7. An aircraft according to claim 1 in which the top surfaces of the wings are continuous with the top surfaces of the power plant body and accommodation bodies.

References Cited in the file of this patent

UNITED STATES PATENTS 2,877,965   Wakefield _____ Mar. 17, 1959

FOREIGN PATENTS 652,342   Great Britain _____ May 2, 1951